United States Patent

Longwell

[15] 3,703,080
[45] Nov. 21, 1972

[54] HYBRID ROCKET PROPELLANT USING POLYMERIC SPONGE AND LIQUID OXIDIZER

[72] Inventor: John P. Longwell, Scotch Plains, N.J.

[73] Assignee: Esso Research and Engineering Company

[22] Filed: June 2, 1959

[21] Appl. No.: 817,970

[52] U.S. Cl. .................................60/219, 102/99
[51] Int. Cl. ..............................................C06d 5/10
[58] Field of Search .....60/35.4, 219; 52/0.5; 102/98, 102/99; 149/2, 19, 74, 87, 20

[56] References Cited

UNITED STATES PATENTS

| | | | |
|---|---|---|---|
| 2,791,883 | 5/1957 | Moore et al. | 149/19 |
| 2,802,332 | 8/1957 | Orsino | 149/19 X |
| 2,857,258 | 10/1958 | Thomas | 149/19 |

OTHER PUBLICATIONS

Chem. & Eng. News, May 27, 1957, pp. 18–23 [TP1.T418]
Zaehringer, "Solid Propellant Rockets–Second Stage" American Rocket Co., Box 1112, Wyandotte, Mich., pp. 229–230 [ L783.3Z3 1958]

*Primary Examiner*—Benjamin R. Padgett
*Attorney*—Small, Thomas, Dunham and Marx and R. D. Manahan

EXEMPLARY CLAIM

9. A method for developing thrust in a rocket combustion chamber by combusting a by-propellant which comprises igniting a rubbery sponge having cells and an intercellular matrix of cured solid polymeric substance and propellant fuel in said matrix mixed with the cured polymeric material, said cells containing a liquid oxidizing agent reactive with the fuel and the cured polymeric substance on ignition, said fuel and oxidizing agent composing at least 75 wt.% of the by-propellant.

10 Claims, 1 Drawing Figure

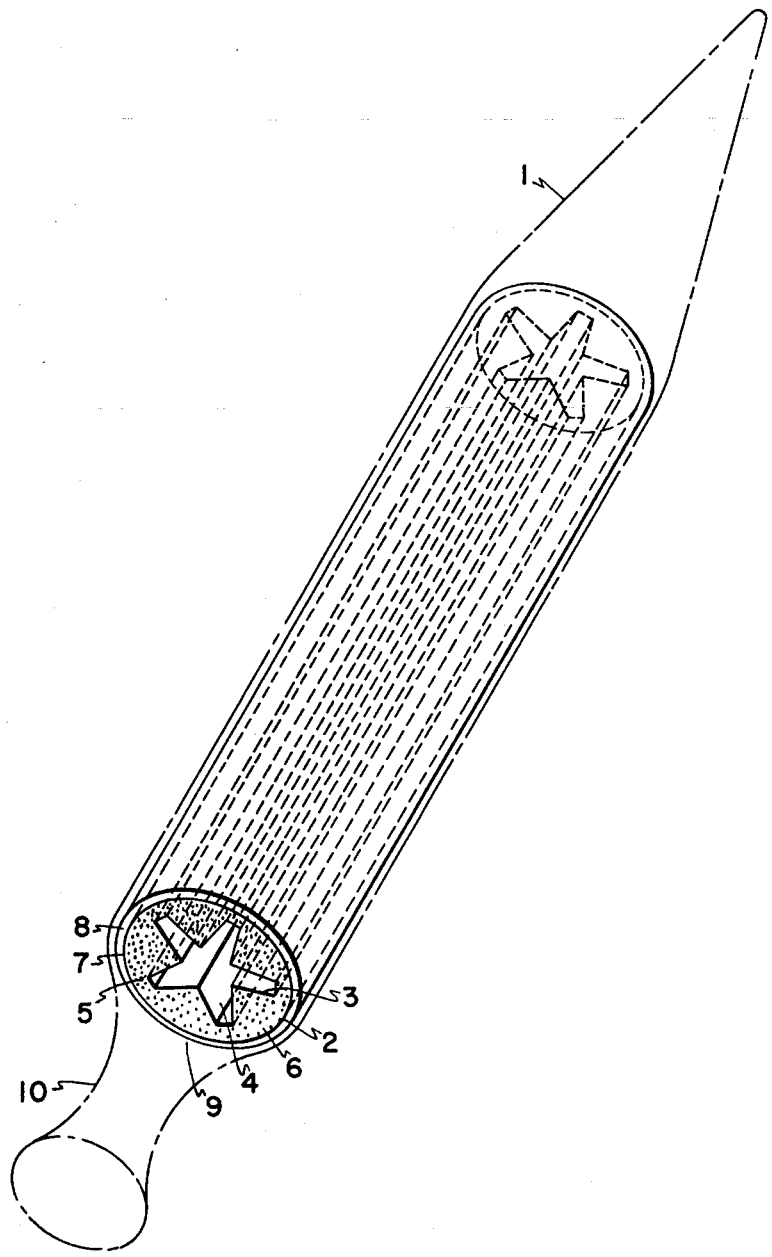
John P. Longwell INVENTOR
BY R. S. Manahan
PATENT ATTORNEY

HYBRID ROCKET PROPELLANT USING POLYMERIC SPONGE AND LIQUID OXIDIZER

The present invention relates to novel sponges which are useful as supports for fuel and/or oxidizing agents employed in rocket propellants. Specifically, it concerns the use of a cellular polymeric substance as a matrix for materials which are capable of imparting propulsion to rockets.

A rocket or jet propulsion device as used herein is a rigid container for matter and energy so arranged that a portion of the matter can absorb the energy in kinetic form and subsequently eject it in a specified direction. The type of rocket to which the invention has particular application is that which is generally designated as a pure rocket, that is to say, a rocket in which the means producing the thrust does not make use of the surrounding atmosphere. The rocket is propelled by contacting the fuel or propellant in a combustion chamber with a suitable oxidizing agent which produces burning and therefore causes the release of energy at a high but controllable rate from the combustion chamber. The solid bi-propellants normally used in rockets consist of solid fuel and solid oxidizing agents. While solid oxidizing agents are highly useful, they are usually less effective than liquid oxidizing agents because the latter in most instances permit attainment of higher specific impulses.

It is an object of this invention to provide a novel sponge support for liquid and solid propellant components. Still another object is to prepare a hybrid propellant containing a liquid oxidizing agent which has the dimensional integrity possessed by solid propellants.

In accordance with the present invention, novel solid polymeric substances which have a cellular nature are employed to support substances used to propel rockets. Moreover, it has been found that sponge-like elastomers having open cells will soak up (or otherwise introduce) highly active liquid oxidizers into their matrix which contains a substantial amount of fuel and thereby form highly suitable hybrid rocket propellants.

In carrying out the present invention any suitable high molecular weight polymer, especially one which is rubbery in nature, is used to prepare a foam or sponge which contains open cells, that is to say, cells which are interconnecting and which are open to the surrounding atmosphere. Known methods for preparing foams or sponges may be employed to make the matrices which hold the liquid oxidizing agent. The polymer should be compounded at an elevated temperature, e.g., 100°–300°F., with the rocket fuel and other compounding ingredients used in the rubber art, the blowing agent generally being added last at a lower temperature to prevent a premature blow.

One method for preparing an open cell sponge involves compounding a solid rubbery polymer having a hydrocarbon backbone, such as butyl rubber, styrene-butadiene rubber (SBR), polychloroprene rubber, hexafluoropropylene-vinylidine fluoride copolymer and the like with a solid metal fuel, e.g., powdered aluminum, a blowing agent and a curing agent, e.g., sulfur. The compounded polymer is then subjected to an elevated temperature, preferably about 250° to 350°F., in a mold or oven for up to 2 or 3 hours to form a cured open cell sponge, that is one which is capable of absorbing more than about 5 wt. % of water. A typical recipe for such a sponge is as follows:

| Components | Parts By Weight | |
|---|---|---|
| | General | Preferred |
| Polymer | 100 | 100 |
| Solid Fuel or Filler | 0–400 | 20–300 |
| Liquid Fuel | 0–60 | 20–60 |
| Blowing Agent | 5–30 | 10–20 |
| Activator | 2–20 | 4–12 |
| Accelerator | 0–20 | 1–5 |
| Curing Agent | 0–20 | 1–12 |
| Metal Oxide | 0–20 | 1–10 |

The filler, if used at all, is generally carbon black or clay. If a liquid fuel is employed it is preferred to use a naphthenic or paraffinic hydrocarbon since it will also serve as a processing oil. Solid fuels which may be partly or completely substituted for the filler in the above recipe include powdered metal and metal-containing substances in which the metal is selected from Groups I to IV of the Periodic Chart of Elements. While fuels such as lithium hydride and titanium are useful, the preferred fuels are the Group II and III metals, e.g., aluminum, beryllium, boron, magnesium and their hydrides. The blowing agent is generally a material which will decompose at elevated temperatures to produce oxygen- or nitrogen-containing gases that cause the formation of numerous open cells in the solid polymer. However, other nondecomposing blowing agents such as low boiling paraffinic hydrocarbons in the $C_4$ to $C_5$ range may be used. Suitable blowing agents include sodium carbonate, dinitrosopentamethylene tetramine, azoisobutyric nitrile and pentane. It is sometimes desirable to use an activator, such as urea or stearic acid, to initiate the action of certain blowing agents, e.g., dinitrosopentamethylene tetramine or sodium bicarbonate.

Accelerating agents such as tellurium diethyl dithiocarbamate and tetramethyl thiuram disulfide may be employed to assist the curing agent which is usually sulfur when natural rubber, SBR or butyl rubber is the polymer, zinc oxide when halogenated butyl rubber is used and hexamethylene diamine when copolymers containing large amounts of fluorine are used in the preparation of the sponge. It is also sometimes desirable to compound the polymer with a metal oxide, such as zinc oxide or magnesium oxide, in addition to the curing agent, in order to obtain good physical properties in the sponge. The compounded polymer should be heated at an elevated temperature which is generally between 200° and 400°F. for at least 1 minute, e.g., 5–30 minutes. Where the polymer is natural rubber, butyl rubber, halogenated butyl rubber or styrene-butadiene rubber, it has been found that heating the compounded rubber at 250°–350°F. for about 10–30 minutes in a closed mold produces a sponge which has excellent physical characteristics. The aforementioned rubbers generally have viscosity average molecular weights of at least 100,000 and sometimes as high as 2,000,000 or more.

Butyl rubber, a term well known in the rubber art, e.g., Chapter 24 in "Synthetic Rubber" edited by G. Whitby, is a rubbery copolymer comprising a major proportion of a monoolefin having four to seven carbon atoms and a minor proportion of a multiolefin having four to eight carbon atoms. The most commonly employed monoolefin is isobutylene, although other monoolefins such as 3-methyl-butene-1 and 4-methylpentene-1 may be used. Suitable multiolefins, which are generally conjugated diolefins, include isoprene, butadiene-1,3, dimethyl butadiene-1,3, piperylene and the like. Most of the copolymers contain about 90 to 99.5 wt. % isoolefin and 0.5 to 10 wt. % diolefin, which in most instances is isoprene. The polymerization is generally carried out at a low temperature, e.g., between −50° and −165°C., in the presence of a Friedel-Crafts catalyst, such as aluminum trichloride, dissolved in a lower alkyl halide, such as methyl chloride, ethyl chloride, etc. Their preparation is fully described in U.S. Pat. No. 2,356,128. Butyl rubber has a viscosity average molecular weight between about 200,000 and 1,500,000 or more and a Wijs iodine number between about 1 and 50.

The physical and chemical properties of butyl rubber may be modified by introducing a small quantity of halogen into the polymer. In producing halogenated butyl rubber, unmodified, unvulcanized butyl rubber is carefully halogenated until it contains about at least 0.5 wt. % (preferably at least about 1.0 wt. %), but not more than about "X" wt. % of combined chlorine or 3 "X" wt. % combined bromine wherein:

$$X = \frac{M_3 L}{(100-L)M_1 + L(M_2 + M_3)} \times 100$$

and $L$ = mole % of the multiolefin in the polymer
$M_1$ = molecular weight of the isoolefin
$M_2$ = molecular weight of the multiolefin
$M_3$ = atomic weight of the halogen Restated, there should be at least about 0.5 wt. % of combined halogen in the polymer but not more than about one atom of chlorine or three atoms of bromine combined in the polymer per molecule of multiolefin present therein; i.e., per double bond in the polymer.

Styrene-butadiene rubber is made by copolymerizing the monomers in an aqueous emulsion at −40° to 120°F. in the presence of a peroxide or persulfate catalyst. The copolymer generally contains about 80 percent butadiene and 20 percent styrene.

The open cells of the foam or sponge are at least partially filled with a liquid oxidizing agent capable of reacting rapidly with the fuel upon ignition to produce low molecular weight gases. The liquid oxidizing agent should not attack the sponge at ambient temperatures. Many of the oxidizing agents useful in conventional bi-propellant systems may be employed. Among the oxidizing agents which may be used in the propellants are hydrogen peroxide, white fuming nitric acid or red fuming nitric acid, tetranitromethane, bromotrifluoride, etc. The preferred oxidizing agents are inorganic and organic nitrogen compounds; the latter compounds generally contain one to four carbon atoms. The sponge may be immersed in the oxidizing agent or otherwise subjected to treatment so that it soaks up a substantial amount of oxidizing liquid. In order to serve as a high energy propellant, the fully treated sponge or foam should contain about 75 to 95 wt. % fuel and oxidizing agent, while the polymer matrix (intercellular substance), exclusive of the fuel but including the polymer and curatives should not comprise more than 25 wt. % and preferably less than 10 wt. %, of the finished rocket propellant.

One of the advantages of the present invention is that the fuel may be maintained separate from the oxidizer until just prior to the use of the propellant in the rocket. This factor would substantially improve the shelf life of the propellant charges. In other instances the sponge may be filled with the oxidizer and stored inside the rocket.

It is important in carrying out the present invention to employ a minimum of noncombustible material. It is advantageous to use a hydrocarbon polymer such as butyl rubber or styrene-butadiene rubber since these materials have some fuel value. They have the added benefit of being readily available at a low cost.

Since some rubbers, such as styrene-butadiene rubber, are prepared by an emulsion technique, the solid foam may be prepared directly from the latex according to methods well known to those skilled in the rubber art. For instance, a styrene-butadiene rubber latex may be gelled or precipitated and simultaneously blown with air or oxygen to produce a plurality of interconnecting cells in the solid foam produced from the latex.

The accompanying drawing is a schematic sectional view of a rocket containing a hybrid bi-propellant of the present invention which is shown in place in the rocket in a perspective view.

The bi-propellant in rocket 1 comprises a cylindrical sponge 2 which has an internal burning surface 3 in the shape of a star. The star-shaped conduit 4 in the center of sponge 2, which is parallel with the longitudinal axis of said sponge, is formed by the burning surface 3. Conduit 4 may be filled with an igniting substance, e.g., black powder, not shown, which may be ignited by some suitable means, such as an electric match, also not shown. Of course the propellant need not be cylindrical nor have an internal burning surface. For example, it may be cruciform or rod shaped and burn like a cigarette. Thus, any suitable shape or form may be employed. The cells 5 of the sponge 2 are filled with a liquid or semi-liquid oxidizer and its matrix 6 contains fuel, preferably powdered metal or metal hydride. The outer surface 7 of sponge 2 may be coated with a layer 8 of nitrocellulose, rubber, resin or other substance which helps to prevent the loss of liquid oxidizer an may also, where the layer 8 is an adhesive, serve to adhere the outer surface 7 of sponge 2 to the rigid inner wall of the rocket's combustion or reaction chamber 9. The combustion gases of the propellant leave the chamber 9 via nozzle 10.

The following examples are given to illustrate some embodiments of the invention.

EXAMPLE 1

Isobutylene-isoprene butyl rubber having a viscosity average molecular weight of 400,000 and a mole % unsaturation of 1.5 is compounded in a Banbury according to the following recipe and cured at 310°F. for 30 minutes. The blowing agent is added last on a cold laboratory mill.

RECIPE

| Component | Parts By Weight |
| --- | --- |
| Butyl Rubber | 100 |
| Carbon Black SRF | 200 |
| Hydrocarbon Oil* | 50 |

| | |
|---|---|
| Urea | 4 |
| Tellurium Diethyl-Dithiocarbamate | 1.25 |
| Tetramethyl Thiuram Disulfide | 1 |
| Sulfur | 1.25 |
| Zinc Oxide | 5 |
| Dinitroso-Pentamethylene Tetramine | 10 |

*A naphthenic hydrocarbon having a boiling range of 612°F. to 760°F. and a specific gravity of 0.89.

The compounded rubber which is blown and cured in a 6 × 6 × 0.5 inches mold produces an open cell sponge having a density of 0.35 grams/cc. The sponge is then immersed in 98% $H_2O_2$ at ambient (75°F.) temperature and the sponge after withdrawal from the liquid oxidizer contains 50 wt. % oxidizing agent. Another portion of the compounded rubber is placed in another mold which is 6 × ¼ × ¼ inches and blown and cured as described above. The resulting sponge strand is ignited at the top and permitted to combust down its longitudinal axis at atmospheric pressure. It is noted that the burning rate is approximately 1 inches per second.

EXAMPLE 2

Viton A, a tradename for a copolymer of hexafluoropropylene and vinylidene fluoride, is compounded according to the following recipe:

RECIPE

| Component | Parts By Weight |
|---|---|
| Viton A | 100 |
| Boron Powder | 40 |
| Stearic Acid | 10 |
| Dibasic Lead Phosphite | 10 |
| Tricresyl Phosphate | 15 |
| Hexamethylene Diamine Carbamate | 1.5 |
| Sodium Carbonate | 15 |

The ingredients are mixed on a cold mill, the blowing agent (sodium carbonate) being added last. The compounded copolymer is blown and cured in a 6 × 6 × ½ inches mold at 310°F. for 30 minutes to produce an open cell sponge having a density of 0.4 grams/cc. The sponge is then immersed in tetranitromethane at ambient temperature, and the sponge after being withdrawn from the liquid oxidizer contains 55 wt. % tetranitromethane. This fluorocarbon polymer produces a sponge having excellent tensile strengths, e.g., 100 psi, and therefore resists cracking under pressure in the rocket's burning chamber.

Another portion of the compounded fluorocarbon polymer is cured and blown in a 6 × ¼ × ¼ inches mold to produce an open cell sponge strand which after immersion in tetranitromethane burns at the rate of one-half inch per second and produces a green flame. The Viton A used in this Example has a Mooney viscosity (ML 4/212°F.) of 67 and contains about 65 wt. % combined fluorine. This solid rubbery copolymer is highly suitable for the purposes of the present invention because it is highly resistant to attack by oxidizers. Other fluorocarbon polymers such as the copolymer of chlorotrifluoroethylene and vinylidene fluoride may be used in place of Viton A. While these fluorocarbon polymers do not have true hydrocarbon backbones they are considered to have such a backbone for the purposes of this invention. If desired, certain liquid oxidizers may be admixed with a small amount, i.e., less than 1 wt. %, of a thickening or gelling agent such as carboxymethyl cellulose prior to introducing them into the sponge.

EXAMPLE 3

Natural rubber (smoked sheet) is compounded on a cold laboratory mill according to the following recipe:

RECIPE

| Component | Parts By Weight |
|---|---|
| Natural Rubber | 100 |
| Aluminum Powder | 100 |
| Sulfur | 5 |
| Tetramethylthiuram Disulfide | 2.5 |
| Benzothiazyldisulfide | 1.5 |
| Zinc Oxide | 10 |
| Stearic Acid | 10 |
| Hydrocarbon Oil* | 30 |

*The same oil used in Example 1

Portions of the compounded rubber are blown and cured for 30 minutes at 310°F. in a mold 6 × ¼ × ¼ inches and the open cell sponge strands produced are immersed in 98% $H_2O_2$ for 5 to 45 minutes. Immersing a strand in $H_2O_2$ for 15 minutes produces a bi-propellant containing 60 weight percent liquid oxidizer. When such a strand is ignited, its burning rate is about 1 inch per second, and white sparks are produced. Instead of merely immersing the sponge in the liquid oxidizing agent, it can be stored in the rocket's burning chamber and evacuated and filled with oxidizer just prior to use.

The essence of the invention is the use of rubbery sponges in solid rocket propellants to permit the employment of liquid oxidizers which are generally more effective than solid oxidizers. Any polymer may be used which is capable of forming such a sponge. Resort may be had to various modifications and variations of the present invention without departing from the spirit of the discovery or the scope of the appended claims.

What is claimed is:

1. A rocket propellant which comprises a rubbery sponge having cells and an intercellular matrix of a solid rubbery polymeric substance having compounded therein a fuel, said polymeric substance being an elastomer blown into a sponge and cured, and said cells being filled with a liquid oxidizing agent reactive with the cured matrix and the fuel compounded therein on ignition to generate combustion gas for imparting propulsion, said oxidizing agent and fuel composing at least 75 wt.% of the propellant.

2. A rocket propellant according to claim 1, wherein the liquid oxidizing agent is thickened to a semi-liquid.

3. A rocket propellant according to claim 1, wherein the elastomer is a copolymer of a mono-olefin and a diolefin.

4. A rocket propellant according to claim 1, wherein said fuel compounded with the rubbery polymeric substance is a powdered metal selected from Groups I to IV of the Periodic Chart of Elements.

5. A rocket propellant according to claim 1, wherein the rubbery polymeric substance is cured butyl rubber.

6. A rocket propellant according to claim 1, in which the rubbery polymeric substance contains halogen.

7. The method for preparing a rocket propellant which comprises admixing a curable rubbery polymer with a powdered fuel, blowing agent, and curing agent, heating the resulting mixture at elevated temperature until a cured rubbery sponge having cells and an intercellular matrix of the cured rubbery polymer and powdered fuel mixed with the polymer in the matrix is obtained and filling the cells of said sponge with a liquid oxidizing agent reactive with the cured polymer and the fuel compounded therein on ignition, said oxidizing agent and said fuel composing at least 75 wt.% of the propellant.

8. A method for preparing a hybrid rocket propellant which comprises admixing 100 parts by weight of a curable rubbery hydrocarbon polymer with about 20 to 300 parts by weight of fuel, about 5 to 30 parts by weight of a blowing agent and 1 to 20 parts by weight of a curing agent, heating the resulting mixture to an elevated temperature until the mixture forms a cured open cell rubbery sponge and substantially filling the cells in said sponge with a liquid oxidizing agent reactive with the fuel, said oxidizing agent and said fuel comprising at least 75 wt.% of the propellant.

9. A method for developing thrust in rocket combustion chamber by a combusting a by-propellant which comprises igniting a rubbery sponge having cells and an intercellular matrix of cured solid polymer substance and propellant fuel in said matrix mixed with the cured polymeric material, said cells containing a liquid oxidizing agent reactive with the fuel and the cured polymeric substance on ignition, said fuel and oxidizing agent composing at least 75 wt.% of the by-propellant.

10. A rocket propellant of blown and cured rubbery sponge having cells and intercellular matrix of cured rubbery polymeric substance containing admixed therein a solid fuel, said cells containing a liquid oxidizing agent reactive with the solid fuel on ignition to generate combustion gas for propulsion, said oxidizing agent and said fuel composing about 75 to 95 wt.% of the propellant.

* * * * *